(12) United States Patent
Day, III et al.

(10) Patent No.: US 7,277,991 B2
(45) Date of Patent: Oct. 2, 2007

(54) METHOD, SYSTEM, AND PROGRAM FOR PREFETCHING DATA INTO CACHE

(75) Inventors: Kenneth Fairclough Day, III, Tucson, AZ (US); John Jay Wolfgang, Tucson, AZ (US); Kenneth Wayne Boyd, Tucson, AZ (US); Philip Matthew Doatmas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 10/822,410

(22) Filed: Apr. 12, 2004

(65) Prior Publication Data
US 2005/0228955 A1  Oct. 13, 2005

(51) Int. Cl.
*G06F 12/00* (2006.01)
(52) U.S. Cl. .................. 711/137; 711/112; 711/113
(58) Field of Classification Search ............... 711/112, 711/113, 137
See application file for complete search history.

(56) References Cited

U.S. PATENT DOCUMENTS

| | | | |
|---|---|---|---|
| 5,379,391 A | 1/1995 | Belsan et al. | |
| 5,426,761 A | 6/1995 | Cord et al. | |
| 5,627,990 A | 5/1997 | Cord et al. | |
| 5,737,747 A | 4/1998 | Vishlitzky et al. | |
| 5,829,046 A | 10/1998 | Tzelnic et al. | |
| 5,892,915 A | 4/1999 | Duso et al. | |
| 5,892,921 A | 4/1999 | Murakami et al. | |
| 5,933,603 A | 8/1999 | Vahalia et al. | |
| 5,974,503 A | 10/1999 | Venkatesh et al. | |
| 5,987,621 A | 11/1999 | Duso et al. | |
| 6,061,504 A | 5/2000 | Tzelnic et al. | |
| 6,230,200 B1 | 5/2001 | Forecast et al. | |
| 6,260,115 B1 | 7/2001 | Permut et al. | |
| 6,345,338 B1 | 2/2002 | Milillo et al. | |
| 6,438,661 B1 | 8/2002 | Beardsley et al. | |
| 6,449,697 B1 | 9/2002 | Beardsley et al. | |
| 6,470,421 B1 | 10/2002 | Bui et al. | |
| 6,647,467 B1* | 11/2003 | Dowling | 711/140 |
| 2004/0078527 A1* | 4/2004 | Tetrick | 711/137 |
| 2004/0123041 A1* | 6/2004 | Krishnaiyer et al. | 711/137 |
| 2004/0230742 A1* | 11/2004 | Ikeuchi et al. | 711/112 |
| 2005/0198439 A1* | 9/2005 | Lange et al. | 711/137 |

OTHER PUBLICATIONS

Daniel A. Connors, et al., "An Architecture Framework for Introducing Predicated Execution into Embedded Microprocessors", Dept. of Electrical and Computer Eng. and Logic Systems Laboratory, pp. 1-10; 1999.
Robert C. Elliot, "Information Technology—SCSI Block Commands—2 (SBC-2)",working draft American National Standard, Project T10/1417-D, Revision 12, Jan. 25, 2004, reference No. ISO/IEC 14776-322:200x ANSI INCITS.***:200x, pp. i-iv, 46-48.
IBM Corporation, "PowerPC 601 Microprocessor", White paper, [online] [Retrieved on Feb. 27, 2004], retrieved from the Internet at <URL: http://www-1.ibm.com/servers/eserver/pseries/hardware/whitepapers/power/ppc_601.html.

* cited by examiner

*Primary Examiner*—Woo H. Choi
(74) *Attorney, Agent, or Firm*—David W. Victor; Konrad Raynes & Victor LLP (57) ABSTRACT

Provided are a method, system and program for prefetching data into cache. A prefetch command is processed that indicates at least one conditional statement and at least one block to prefetch from storage to cache in response to determining that the conditional statement is satisfied.

27 Claims, 6 Drawing Sheets

Prefetch Command

FIG. 6

Conditional Statement

FIG. 7

METHOD, SYSTEM, AND PROGRAM FOR PREFETCHING DATA INTO CACHE

BACKGROUND OF THE INVENTION

1. Field of the Invention

The present invention relates to a method, system, and program for prefetching data into cache.

2. Description of the Related Art

Data prefetching techniques are used to prefetch data from a non-volatile storage device, such as one or more hard disk drives, to a high speed memory, such as a volatile memory device referred to as a cache, in anticipation of future data requests. The data requests may then be serviced from the high speed cache instead of the storage device which takes longer to access. In this way, data may be returned to the requesting device faster.

During a sequential read operation, an application program, such as a batch program, will process numerous data records stored at contiguous locations in the storage device. It is desirable during such sequential read operations to prefetch the sequential data into cache in anticipation of the requests from the application program. Present techniques used to prefetch sequential blocks of data include sequential caching algorithms systems, such as those described in the commonly assigned patent entitled "CACHE DASD Sequential Staging and Method," having U.S. Pat. No. 5,426,761. A sequential caching algorithm detects when a device is requesting data as part of a sequential access operation. Upon making such a detection, the storage controller will begin prefetching sequential data records following the last requested data record into cache in anticipation of future sequential accesses. The cached records may then be returned to the application performing the sequential data operations at speeds substantially faster than retrieving the records from a non-volatile storage device.

Another prefetching technique includes specifying a block of contiguous data records to prefetch into cache in anticipation of a sequential data request. For instance, the Small Computer System Interface (SCSI) provides a prefetch command, PRE-FETCH, that specifies a logical block address where the prefetching operation begins and a transfer length of contiguous logical blocks of data to transfer to cache. The SCSI PRE-FETCH command is described in the publication "Information Technology-SCSI Block Commands-2 (SBC-2)", published by ANSI on Jan. 25, 2004, reference no. ISO/IEC 14776-322:200, Rev. 12, which publication is incorporated herein by reference in its entirety.

U.S. Pat. No. 6,449,697 describes a technique for prefetching non-contiguous blocks of data by submitting a data structure with the prefetch command specifying the non-contiguous data blocks to prefetch.

SUMMARY

Provided are a method, system and program for prefetching data into cache. A prefetch command is processed that indicates at least one conditional statement and at least one block to prefetch from storage to cache in response to determining that the conditional statement is satisfied.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
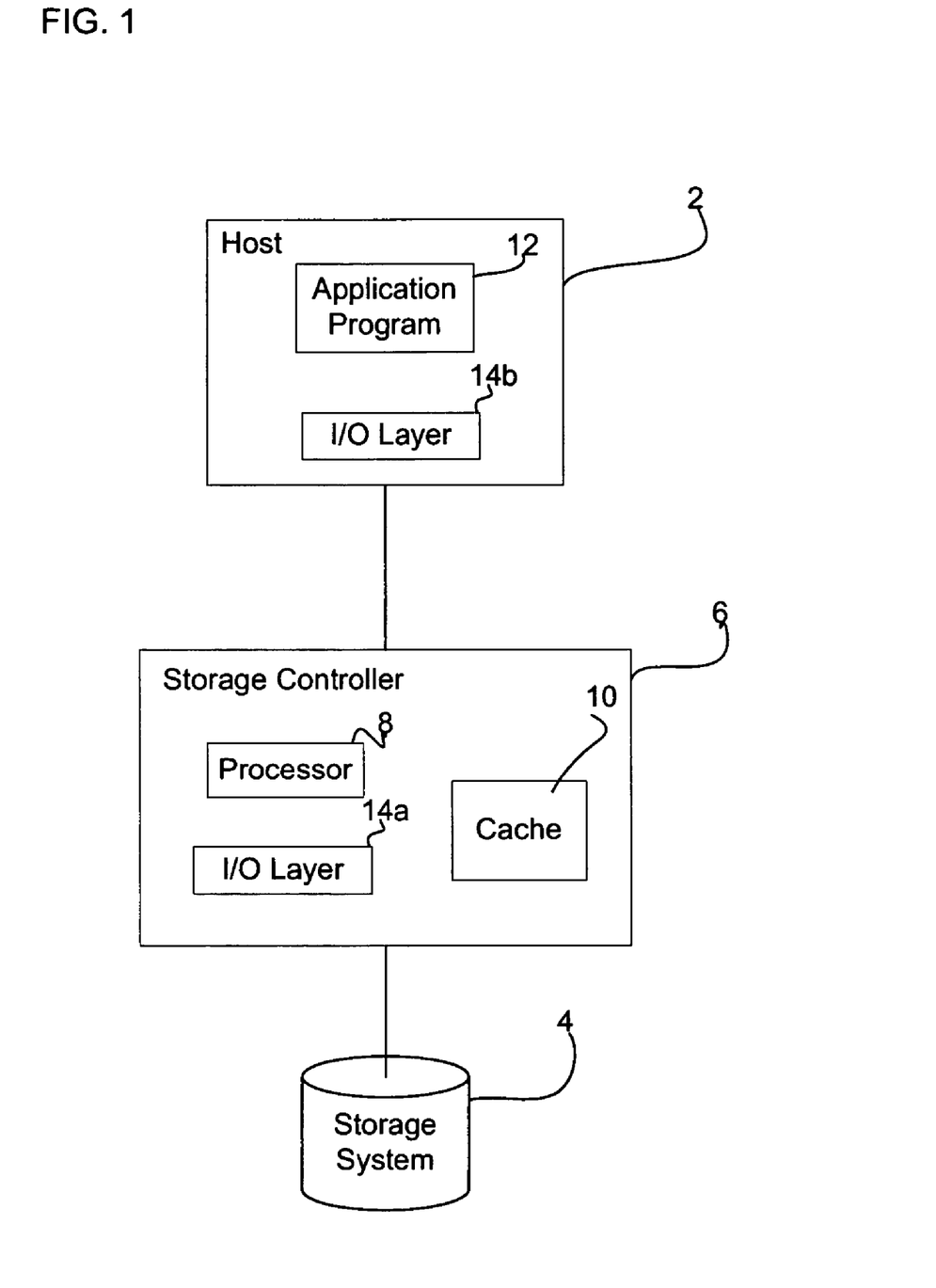
FIG. 1 illustrates a computing environment in which embodiments are implemented.

FIG. 1 illustrates a computing environment in which aspects of the invention are implemented. One or more hosts 2 (only one is shown) communicate Input/Output (I/O) requests to a storage system 4 through a storage controller 6. The host 2 may communicate with the storage controller 6 via a network, such as a Local Area Network (LAN), Storage Area Network (SAN), Wide Area Network (WAN), wireless network, etc. Alternatively, the host 2 may communicate with the storage controller 6 over a bus interface, such as a Peripheral Component Interconnect (PCI) bus. The host 2, storage system 8, and storage controller 6 may be housed in separate machines or be included in the same machine connecting via one or more bus interfaces. The storage controller 6 may comprise any storage management system known in the art, such as a storage controller, server, enterprise storage server, etc. The storage system 4 may comprise any storage system known in the art, such as a Direct Access Storage Device (DASD), Just a Bunch of Disks (JBOD), a Redundant Array of Independent Disks (RAID), virtualization device, tape storage, optical disk storage, or any other storage system known in the art. The host 2 may comprise any computing device known in the art, such as a workstation, desktop computer, server, mainframe, handheld computer, telephony device, etc. The host 2 includes an application program 12 that generates I/O requests.

The storage controller 6 includes a processor 8 and a cache 10. The cache 10 is comprised of one or more volatile memory devices. The storage controller 6 stages data blocks into the cache 10 retrieved from the storage system 4 in anticipation of subsequent requests for the data. A "data block" comprises any known accessible unit of data known in the art, such as a byte at a Logical Block Address (LBA), a track, a fraction of a byte, etc. The host 2 and storage controller 6 include I/O layers 14a, 14b that comprise the code to process I/O commands. The I/O layer 14a, 14b may comprise a driver program implementing an I/O protocol, such as a Small Computer System Interface (SCSI) driver, Internet SCSI (iSCSI) driver, or any other protocol driver for handling I/O requests. Alternatively, the I/O layers 14a, 14b may comprise a client/server storage management or database program, where such client/server program is used to generate, communicate, and process I/O requests.

Figure 2:
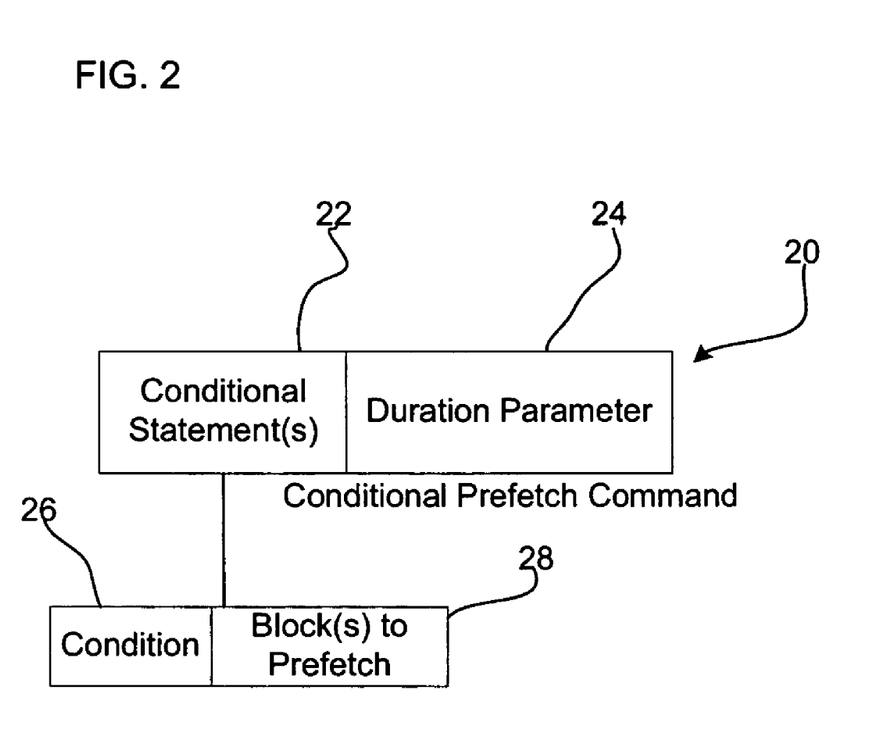
FIGS. 2, 5, and 6 illustrate conditional prefetch commands in accordance with embodiments.

In described embodiments, the application program 12 generates conditional prefetch requests to cause the storage controller 6 to prefetch data depending on different conditions. FIG. 2 illustrates an example of a format of a prefetch command 20 that the application program 12 generates through the I/O layer 14b. The prefetch command 20 includes one or more conditional statements 22 and a duration parameter 24 providing some limitation on the duration the conditional prefetch command 20 remains effective. For instance, the duration parameter 24 may specify a time during which the conditional prefetch command 20 remains in effect or provide some condition that causes the conditional prefetch command 20 to terminate at the storage controller 6, such as the access of a particular section of data in the storage system 4, session termination, time expiration, etc. Alternatively, the storage controller 6 and I/O layer 14a may maintain independent rules for the duration of the conditional prefetch command 20. The conditional statements 22 include a condition 26 specifying a conditional event. If the conditional event in condition 26 occurs, then the corresponding blocks indicated in the blocks to prefetch 28 are prefetched from the storage system 4 into the cache 10. In certain embodiments, the condition 26 comprises an access to one or more blocks, and the satisfaction of this condition 26, i.e., access to the specified blocks in the storage system 4 causes the prefetch of the specified blocks 28. The blocks to prefetch indicated in the blocks to prefetch 28 field may be contiguous or non-contiguous. In certain embodiments, the condition 26 may specify whether the access is a read or write, so the prefetch is only performed in a response to the specified read or write to the block specified in the condition 26.

Below is pseudo-code providing an example of the conditional statements 22 that may be included in a conditional prefetch command 20:

If Block to read 23, then Prefetch blocks 25, 27, 28, 29, 30, 31

If Block to read 56, then Prefetch blocks 57, 58, 59, 60, 61, 62

If Block to read 123, then Prefetch blocks 212, 234.

Figure 3:
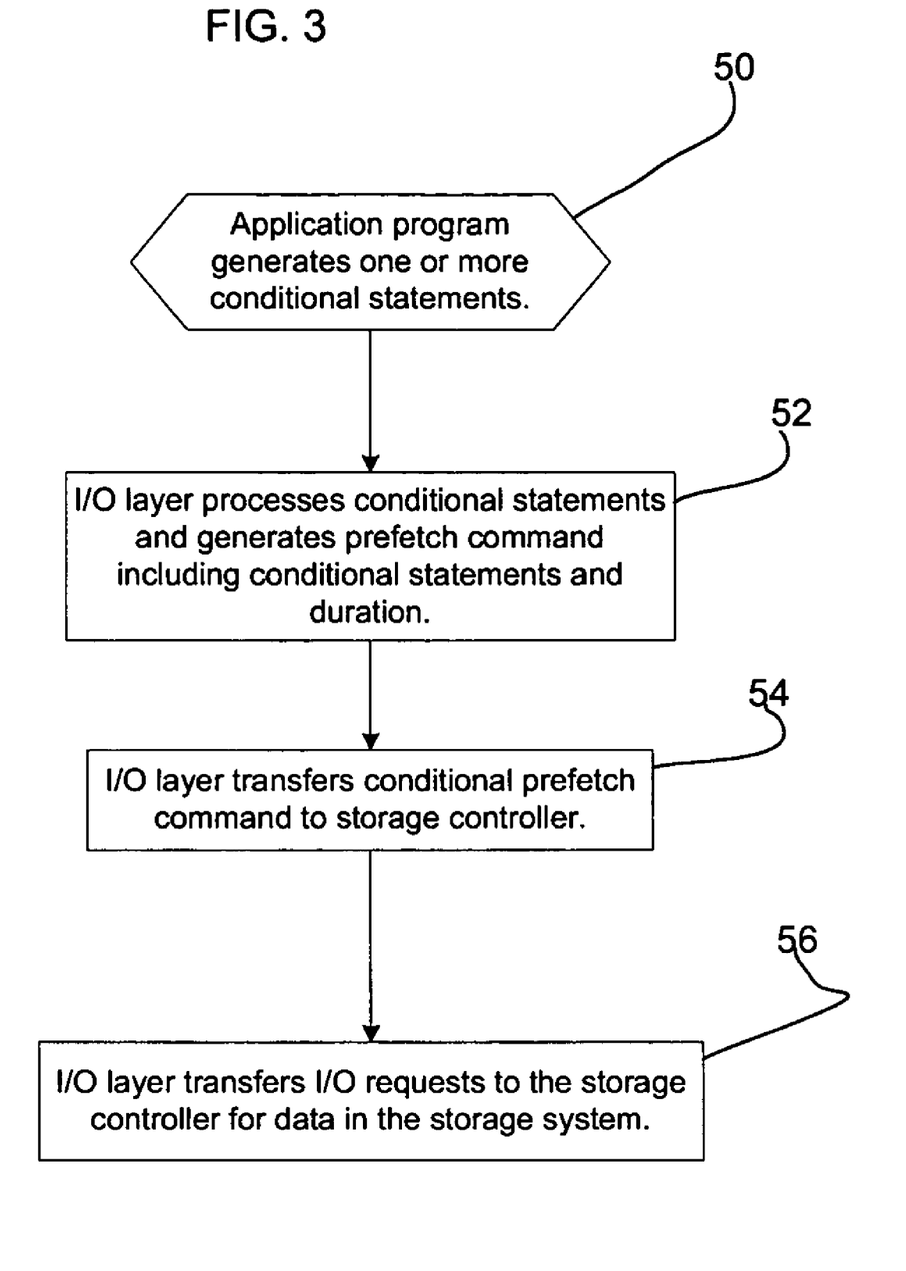
FIGS. 3, 4, and 7 illustrate operations to generate and process a conditional prefetch command in accordance with embodiments.

FIG. 3 illustrates operations performed in the host 2 to generate and transmit a conditional prefetch command 20 (FIG. 2). At block 50, the application program 12 generates one or more conditional statements to prefetch blocks if a certain condition is satisfied, such as an access to a specified block. The application program 12 may implement a predictive analysis program to determine the blocks users will likely access if they access a specific one or more blocks. The predictive analysis component of (or external to) the application program 12 may collect statistics on user access patterns to determine the likely blocks a user will access in the future depending on a currently accessed block to anticipate user access patterns. The I/O layer 14b processes conditional statements from the application program 12 and generates (at block 52) a prefetch command 20 including conditional statements 22 and a duration 24 that is transferred (at block 54) to the storage controller 6. In alternative embodiments, the application program 12 may generate the conditional statement 20 itself and forward to the storage controller 6. After transmitting a conditional prefetch command 20, the I/O layer 14b (or application program 12) may submit (at block 56) I/O requests to the storage controller 6 to access, i.e., read or write, data in the storage system 4.

Figure 4:
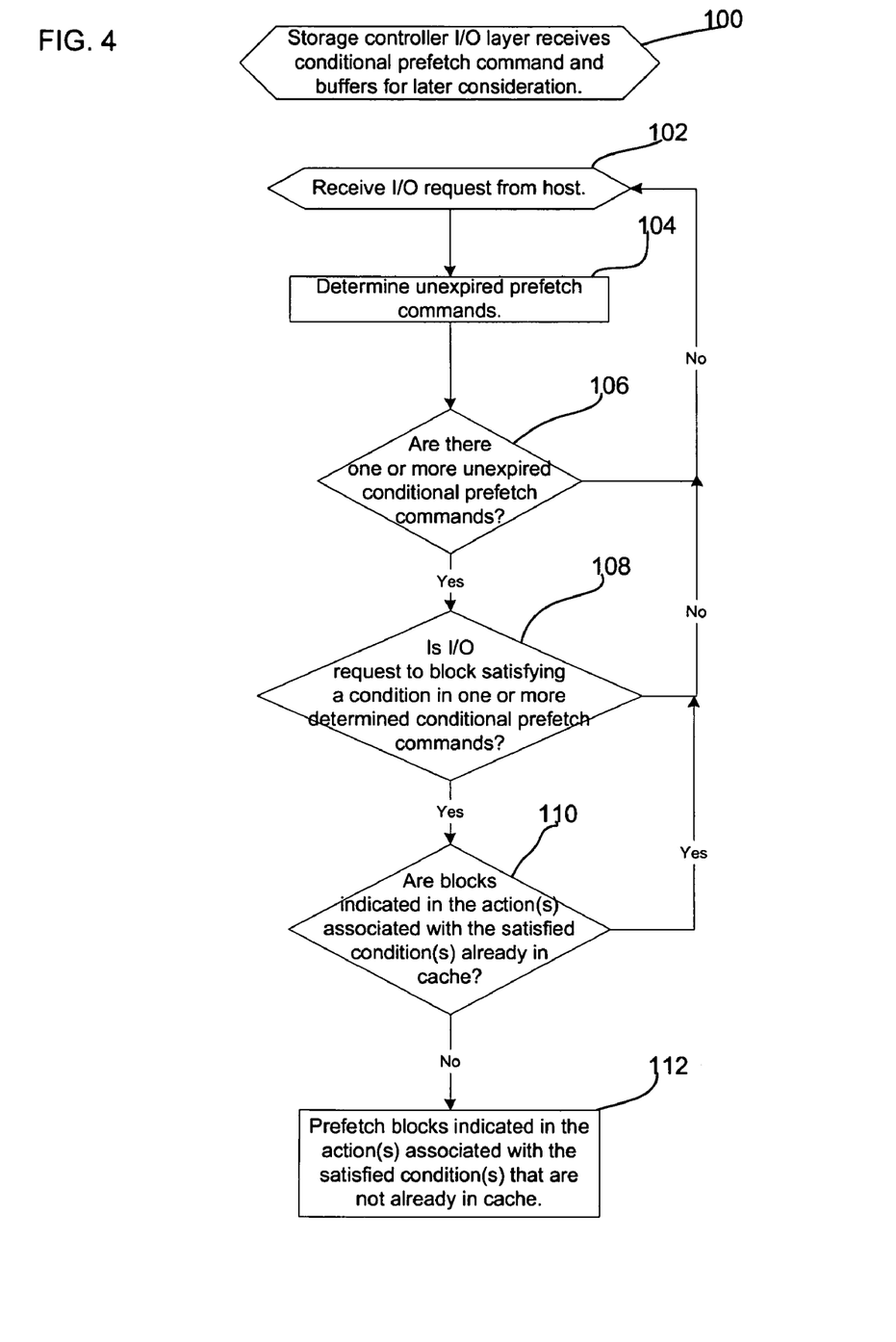

FIG. 4 illustrates operations the processor 8 of the storage controller 6 performs when executing code in the I/O layer 14a or some other program component accessible to the processor 8 to process a conditional prefetch command 20. Upon receiving (at block 100) a conditional prefetch command 20, the processor 8 buffers such received command 20 for later consideration. Subsequently, upon receiving (at block 102) an I/O request from the host 2 directed to the storage system 4, the processor 8 determines (at block 104) unexpired conditional prefetch commands 20, i.e., those commands 20 having a duration 24 that has not expired. This determination may be made by considering the duration parameter 24 provided with received conditional prefetch commands 20 and determining whether according to such parameter 24 the conditional prefetch command 20 has expired. Alternatively, the processor 8 may have its own parameters and technique for determining whether a prefetch command 20 has expired independent of the host 2. As mentioned, the duration may be determined by a timer, session, etc. If (at block 106) there are one or more unexpired conditional prefetch commands 20 and if (at block 108) the I/O request is to a block satisfying a condition 26 in one or more determined unexpired conditional prefetch commands 20 and if (at block 110) the blocks indicated in the blocks to prefetch 28 are not already in cache, then the processor 8 prefetches (at block 112) the blocks indicated in the blocks to prefetch 28 field associated with the satisfied condition(s) 26 that are not already in cache 10. Otherwise, if either there is not one or more unexpired conditional prefetch commands 20 (at block 106) or if (at block 108) the I/O request is not to a block satisfying a condition 26 in one or more determined unexpired conditional prefetch commands 20 or if (at block 110) the blocks indicated in the blocks to prefetch 28 are already in the cache 10, then control proceeds back to block 102 to wait to process further I/O requests from the host 2.

Figure 5:
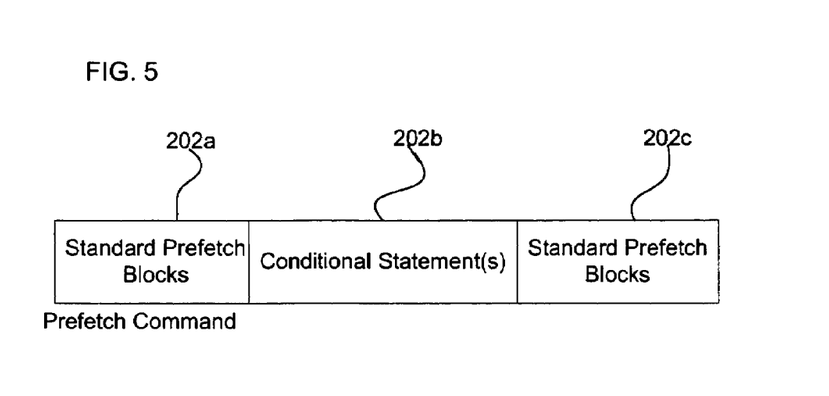
Figure 6:
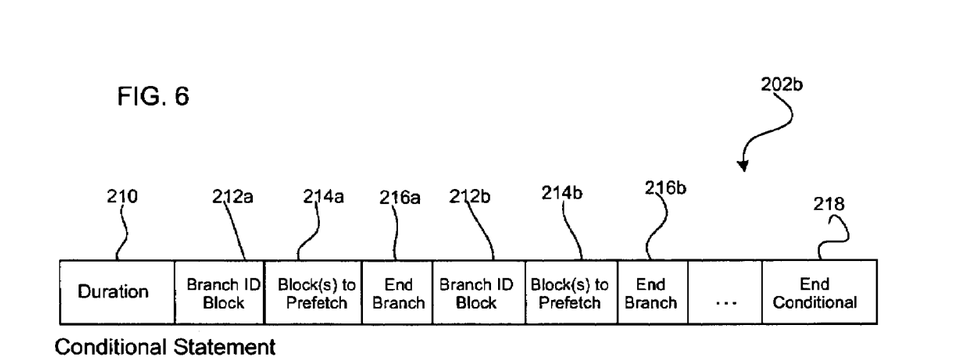

FIGS. 5 and 6 illustrate an additional embodiment of the conditional prefetch command. FIG. 5 illustrates a prefetch command 200 that the I/O layer 14b may generate and submit. The prefetch command 200 may include one or more standard prefetch fields, e.g., 202a and 202c, to prefetch one or more blocks from storage. The prefetch command 200 may also optionally include one or more conditional prefetch statements 202b, where the conditional prefetch statements may be interspersed with the standard prefetch statements. FIG. 6 illustrates information that may be included in the conditional prefetch statement 202b.

With respect to FIG. 6, the conditional prefetch statement 202b includes a duration 210, which is used in a similar manner to the duration parameter 24 described above to place a temporal limit on the duration during which the conditional prefetch statement 202b remains in effect. The conditional prefetch statement 202b further includes one or more branches, where each branch is comprised of a branch identifier (ID) block, e.g., 212a, 212b, and a block(s) to prefetch field, e.g., 214a, 214b. The branch ID block 212a, 212b specifies the one or more blocks that must be fetched before conditional processing of the prefetch field 214a, 214b. With the conditional prefetch statement 202b only one branch is made effective. Once the condition associated with one branch ID 212a, 212b is realized, i.e., the block(s) indicated in the branch ID field 212a, 212b are fetched, then an operation is performed with respect to the blocks indicated in the blocks to prefetch field 214a, 214b associated with the realized branch ID 212a, 212b. In certain embodiments, after one condition is satisfied, the processing of the conditional prefetch statement 202b is complete and no actions will be taken with respect to the other branch IDs not realized. The end branch field 216a, 216b is a command to end the branch processing and proceed to the end conditional command 218 where the processing of the conditional prefetch statement 202b ends and any other following statements are processed.

Figure 7:
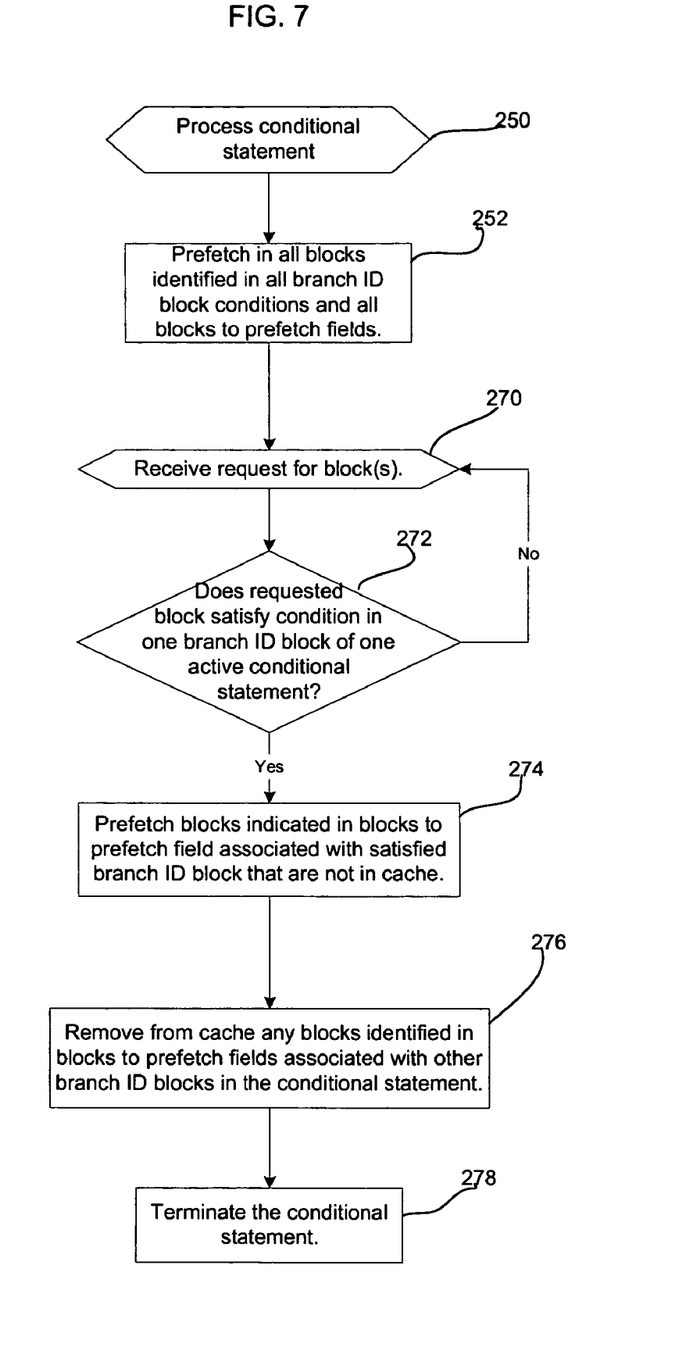

FIG. 7 illustrates operations the processor 8 of the storage controller 6 performs when executing code in the I/O layer 14a or some other program component accessible to the processor 8 to process a conditional statement 202b in a prefetch command 200. Upon processing (at block 250) a conditional statement 202b in a prefetch command 200, the processor 8 prefetches (at block 252) in all blocks identified in the blocks to prefetch fields 214a, 214b and all blocks indicated in the branch ID block 212a, 212b in the conditional statement 202b. Alternatively, the processor 8 may just prefetch the blocks identified in the branch ID blocks 212a, 212b. At this point, the conditional statement 202b is active and considered by the processor 8 when processing I/O block requests from the host 2. In alternative embodiments, the processor 8 may not fetch any of the blocks indicated in the conditional statement 202b until one condition of one branch ID block 212a, 212b is satisfied.

Upon receiving (at block 270) a request for one or more blocks from the host 2, the processor 8 determines (at block 272) whether the requested block(s) satisfies a block condition in one branch ID block 212a, 212b of one active conditional statement 202b, where there may be multiple active conditional statements to consider. If the requested block(s) do not satisfy the condition identified in one branch ID block 212a, 212b of one conditional statement 202b, i.e., do not match the blocks indicated in one branch ID block 212a, 212b in one conditional statement 202b, then control returns to block 270 to wait for a next block request. Otherwise, if (at block 272) one branch block ID 212a, 212b is satisfied, then the processor 8 prefetches (at block 274) the blocks indicated in the blocks to prefetch field 214a, 214b associated with the satisfied branch ID block 212a, 212 that are not already in cache 10. Further, the processor 8 may also remove (at block 276) from cache 10 any blocks identified in the blocks to prefetch fields 214a, 214b associated with other unsatisfied branch ID blocks in the conditional statement. In this way, after the condition of one branch ID block is satisfied, only the prefetch blocks associated with that satisfied branch ID block 212a, 212b remain in cache 10 and the blocks associated with other unsatisfied branch ID blocks are removed if they were prefetched into cache as a result of this command. The blocks may be removed as part of normal destaging operations. The conditional statement 202b is then terminated (at block 278) so that it will not be considered again.

In certain embodiments, multiple conditional statements may be active and considered when receiving a request for blocks. Alternatively, the statements 202a, 202b, 202c in a prefetch command 200 may be processed sequentially, where the statement of standard prefetch blocks, e.g., 202c, following a conditional statement, e.g., 202b, is not processed until the conditional statement ends.

Described embodiments provide techniques to enable conditional prefetching of data from a storage system based on the current accessed data or patterns in order to prefetch blocks likely to be requested. The determination of blocks to prefetch may be determined by predictive analysis programs, user preference, empirical observations or any other technique known in the art.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In described embodiments, the data blocks subject to the conditional checking and prefetching may comprise bytes in storage at logical block addresses, tracks, or any other data unit known in the art.

The illustrated operations of FIGS. 3, 4, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   processing a prefetch command having at least one conditional statement, wherein the conditional statement specifies a condition with respect to content of a received Input/Output (I/O) request and at least one block to prefetch from storage to cache in response to determining that the content of the received I/O request satisfies the condition of the conditional statement;

receiving an I/O request directed to a target block in the storage;

determining whether the content of the received I/O request satisfies the condition specified in the conditional statement of one prefetch command; and prefetching the at least one block to prefetch indicated in the conditional statement of one prefetch command into the cache in response to determining that the content of the I/O request satisfies the conditional statement of one prefetch command.

2. The method of claim 1, wherein the condition with respect to the content of the I/O request specifies a block that when accessed causes the prefetching of the at least one block to prefetch specified in the conditional statement, wherein processing the prefetch command comprises:

generating the prefetch command using predictive analysis techniques to determine blocks anticipated to be accessed if a specified block is accessed, wherein the conditional statement specifies to prefetch the at least one block anticipated to be accessed if the specified block is accessed.

3. The method of claim 1, wherein one conditional statement is satisfied if the content of the I/O request specifies that the I/O request is directed to a specified block in the conditional statement.

4. The method of claim 3, wherein processing the prefetch command comprises generating the prefetch command, further comprising:

transmitting the generated prefetch command to a storage controller; and transmitting Input/Output (I/O) requests to the storage controller after transmitting the generated prefetch command, wherein the storage controller prefetches the at least one block to prefetch indicated in one prefetch command in response to determining that the content of the I/O request specifies that the I/O request is directed to the specified block in the conditional statement of one prefetch command.

5. The method of claim 3, wherein processing the prefetch command further comprises:

including a duration parameter in the prefetch command indicating a duration of the prefetch command.

6. The method of claim 1, wherein determining whether the content of the I/O request satisfies the conditional statement of one prefetch command comprises determining whether the content of the I/O request satisfies the conditional statement of one unexpired prefetch command.

7. The method of claim 1, wherein one conditional statement includes a plurality of branch conditions, wherein each branch condition indicates one block and is associated with at least one block to prefetch, further comprising:

prefetching all blocks to prefetch associated with the branch conditions in the conditional statement; and removing blocks to prefetch from cache associated with branch conditions that are not satisfied in response to determining that the block indicated in one branch condition is accessed.

8. A system, comprising:

a cache;

storage; and circuitry capable of performing operations, the operations comprising:

processing a prefetch command having at least one conditional statement, wherein the conditional statement specifies a condition with respect to content of a received Input/Output (I/O) request and at least one block to prefetch from the storage to the cache in response to determining that the content of the received I/O request satisfies the condition of the conditional statement;

receiving an I/O request directed to a target block in the storage;

determining whether the content of the received I/O request satisfies the condition specified in the conditional statement of one prefetch command; and prefetching the at least one block to prefetch indicated in the conditional statement of one prefetch command into the cache in response to determining that the content of the I/O request satisfies the conditional statement of one prefetch command.

9. The system of claim 8, wherein the conditional statement specifies a block that when accessed causes the prefetching of the at least one block to prefetch specified in the conditional statement, wherein processing the prefetch command comprises:

generating the prefetch command using predictive analysis techniques to determine blocks anticipated to be accessed if a specified block is accessed, wherein the conditional statement specifies to prefetch the at least one block anticipated to be accessed if the specified block is accessed.

10. The system of claim 8, wherein one conditional statement is satisfied if the content of the I/O request specifies that the I/O request is directed to a specified block in the conditional statement.

11. The system of claim 10, wherein processing the prefetch command comprises generating the prefetch command, wherein the operations further comprise:

transmitting the generated prefetch command to a storage controller; and transmitting Input/Output (I/O) requests to the storage controller after transmitting the generated prefetch command, wherein the storage controller prefetches the at least one block to prefetch indicated in one prefetch command in response to determining that the I/O request specifies that the I/O request is directed to the specified block in the conditional statement of one prefetch command.

12. The system of claim 10, wherein processing the prefetch command further comprises:

including a duration parameter in the prefetch command indicating a duration of the prefetch command.

13. The system of claim 8, wherein determining whether the content of the I/O request satisfies the conditional statement of one prefetch command comprises determining whether the content of the I/O request satisfies the conditional statement of one unexpired prefetch command.

14. The system of claim 8, wherein one conditional statement includes a plurality of branch conditions, wherein each branch condition indicates one block and is associated with at least one block to prefetch, wherein the operations further comprise:

prefetching all blocks to prefetch associated with the branch conditions in the conditional statement; and removing blocks to prefetch from cache associated with branch conditions that are not satisfied in response to determining that the block indicated in one branch condition is accessed.

15. An article of manufacture comprising a hardware device including hardware logic or a computer readable storage medium including computer executable code enabled to cause operations to be performed, the operations comprising:

processing a prefetch command having at least one conditional statement, wherein the conditional statement specifies a condition with respect to content of a received Input/Output (I/O) request and at least one block to prefetch from storage to cache in response to determining that the content of the received I/O request satisfies the condition of the conditional statement;

receiving an I/O request directed to a target block in the storage;

determining whether the content of the received I/O request satisfies the condition specified in the conditional statement of one prefetch command; and prefetching the at least one block to prefetch indicated in the conditional statement of one prefetch command into the cache in response to determining that the content of the I/O request satisfies the conditional statement of one prefetch command.

16. The article of manufacture of claim 15, wherein the conditional statement specifies a block that when accessed causes the prefetching of the at least one block to prefetch indicated in the conditional statement, wherein processing the prefetch command comprises:

generating the prefetch command using predictive analysis techniques to determine blocks anticipated to be accessed if a specified block is accessed, wherein the conditional statement specifies to prefetch the at least one block anticipated to be accessed if the specified block is accessed.

17. The article of manufacture of claim 15, wherein one conditional statement is satisfied if the content of the I/O request specified that the I/O request is directed to a specified block in the conditional statement.

18. The article of manufacture of claim 17, wherein processing the prefetch command comprises generating the prefetch command, wherein the operations further comprise:

transmitting the generated prefetch command to a storage controller; and transmitting Input/Output (I/O) requests to the storage controller after transmitting the generated prefetch command, wherein the storage controller prefetches the at least one block to prefetch indicated in one prefetch command in response to determining that the content of the I/O request specifies that the I/O request is directed to the specified block in the conditional statement of one prefetch command.

19. The article of manufacture of claim 17, wherein processing the prefetch command further comprises:

including a duration parameter in the prefetch command indicating a duration of the prefetch command.

20. The article of manufacture of claim 15, wherein determining whether the content of the I/O request satisfies the conditional statement of one prefetch command comprises determining whether the content of the I/O request satisfies the conditional statement of one unexpired prefetch command.

21. The article of manufacture of claim 15, wherein one conditional statement includes a plurality of branch conditions, wherein each branch condition indicates one block and is associated with at least one block to prefetch, wherein the operations further comprise:

prefetching all blocks to prefetch associated with the branch conditions in the conditional statement; and removing blocks to prefetch from cache associated with branch conditions that are not satisfied in response to determining that the block indicated in one branch condition is accessed.

22. The method of claim 1, wherein the condition with respect to the content of the I/O request specifies a block in the storage, wherein the content of the I/O request satisfies the condition in response to determining that the I/O request is directed to a target block comprising the block specified in the condition.

23. The method of claim 22, wherein the condition with respect to the content of the I/O request further specifies one of read or write access, wherein the content of the I/O request satisfies the condition in response to determining that the I/O request comprises the read or write access specified in the condition directed to the target block comprising the block specified in the condition.

24. The system of claim 8, wherein the condition with respect to the content of the I/O request specifies a block in the storage, wherein the content of the I/O request satisfies the condition in response to determining that the I/O request is directed to a target block comprising the block specified in the condition.

25. The system of claim 8, wherein the condition with respect to the content of the I/O request further specifies one of read or write access, wherein the content of the I/O request satisfies the condition in response to determining that the I/O request comprises the read or write access specified in the condition directed to the target block comprising the block specified in the condition.

26. The article of manufacture of claim 15, wherein the condition with respect to the content of the I/O request specifies a block in the storage, wherein the content of the I/O request satisfies the condition in response to determining that the I/O request is directed to a target block comprising the block specified in the condition.

27. The article of manufacture of claim 15, wherein the condition with respect to the content of the I/O request further specifies one of read or write access, wherein the content of the I/O request satisfies the condition in response to determining that the I/O request comprises the read or write access specified in the condition directed to the target block comprising the block specified in the condition.

* * * * *